(12) United States Patent
Kanai et al.

(10) Patent No.: US 7,674,549 B2
(45) Date of Patent: Mar. 9, 2010

(54) FUEL CELL POWER GENERATION APPARATUS, FUEL CARTRIDGE, AND FUEL CELL SYSTEM USING THE SAME

(75) Inventors: Hiroko Kanai, Okegawa (JP); Takashi Yasuo, Ashikaga (JP); Hiroki Kabumoto, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 1030 days.

(21) Appl. No.: 11/363,180

(22) Filed: Feb. 28, 2006

(65) Prior Publication Data
US 2006/0194092 A1    Aug. 31, 2006

(30) Foreign Application Priority Data
Feb. 28, 2005  (JP)  ............................ 2005-054194
May 31, 2005  (JP)  ............................ 2005-159949

(51) Int. Cl.
*H01M 8/02* (2006.01)
*H01M 2/12* (2006.01)
*H01M 8/04* (2006.01)
*B01D 53/02* (2006.01)

(52) U.S. Cl. ............................ 429/34; 429/83; 429/26; 429/147

(58) Field of Classification Search .................... 429/12, 429/13, 34
See application file for complete search history.

(56) References Cited

U.S. PATENT DOCUMENTS

2002/0076599 A1* 6/2002 Neutzler et al. .............. 429/38
2004/0067399 A1* 4/2004 Kobayashi et al. ............. 429/25

FOREIGN PATENT DOCUMENTS

JP     51-137533     11/1976
JP     53-54343 U    5/1978

(Continued)

OTHER PUBLICATIONS

Japanese Office Action, with English Translation, issued in Japanese Patent Application No. JP 2005-054194, dated Mar. 11, 2008.

(Continued)

*Primary Examiner*—Dah-Wei D Yuan
*Assistant Examiner*—Amanda Barrow
(74) *Attorney, Agent, or Firm*—McDermott Will & Emery LLP

(57) ABSTRACT

A fuel cell system is provided in which the amount of a reaction product discharged outside the system can be reduced, the reaction product, such as water, being formed by the electrochemical reaction of a fuel cell. The fuel cell system includes a fuel cell power generation apparatus and a fuel cartridge which is detachable from a fuel cell. The fuel cell power generation apparatus includes a case containing a fuel cell therein, an air intake port provided in the case, and an emitted material discharge port provided in the case. The air intake port and the emitted material discharge port are arranged in different positions of the case. The fuel cartridge includes a fuel storage unit storing fuel, a fuel supply port supplying the fuel to the fuel cell, and a removal unit which removes water discharged from the fuel cell.

4 Claims, 15 Drawing Sheets

FOREIGN PATENT DOCUMENTS

| | | |
|---|---|---|
| JP | 09-213359 | 8/1997 |
| JP | 10-284100 | 10/1998 |
| JP | 2001-022704 | 1/2001 |
| JP | 2001-157096 | 6/2001 |
| JP | 2002-049440 | 2/2002 |
| JP | 2002-190060 | 7/2002 |
| JP | 2003-282131 A | 10/2003 |
| JP | 2004-241363 A | 8/2004 |
| JP | 2005-108717 | 4/2005 |
| JP | 2005-105053 A | 5/2005 |
| JP | 2005-203161 | 7/2005 |
| JP | 2005-332746 | 12/2005 |

OTHER PUBLICATIONS

Japanese Office Action, with English translation, issued in Japanese Patent Application No. 2005-159949, mailed Dec. 1, 2009.

* cited by examiner

FUEL CELL POWER GENERATION APPARATUS, FUEL CARTRIDGE, AND FUEL CELL SYSTEM USING THE SAME

BACKGROUND OF THE INVENTION

1. Field of the Invention

The present invention relates to a fuel cell power generation apparatus, a fuel cartridge, and a fuel cell system using the same. In particular, the invention relates to a fuel cell system in which the amount of a reaction product discharged outside the system can be reduced, the reaction product, such as water, being formed by the electrochemical reaction of a fuel cell.

2. Description of the Related Art

A fuel cell is a device for generating electrical energy from hydrogen and oxygen and is capable of providing high power generation efficiency. One of the main features of a fuel cell is that high power generation efficiency can be expected even in small-scale systems since, in contrast to a conventional power generation method in which the power is generated via a thermal or kinetic energy process, the power is generated through direct power generation. Another feature is that environmental friendliness is excellent since the emission of nitrogen compounds and the like is low, and noise and vibrations are also small. As mentioned above, a fuel cell can effectively utilize the chemical energy contained in fuel and has environmentally friendly characteristics. Therefore, a fuel cell is expected to serve as an energy supply system of the 21st century and has received attention as a new promising power generation system usable in various applications including small to large scale power generation, for example, in space, automobile, and portable device applications. Thus, the technological development of a fuel cell for practical use is fully in progress.

Among various types of fuel cells, a proton-exchange membrane fuel cell can operate at lower temperatures and generate power at higher power densities as compared to other types of fuel cells. Particularly in recent years, a direct methanol fuel cell (DMFC) has received attention as a form of the proton-exchange membrane fuel cell. In the DMFC, methanol aqueous solution serving as a fuel is directly supplied to an anode without modification to obtain electric power through the electrochemical reaction of the methanol aqueous solution with oxygen. In this electrochemical reaction, carbon dioxide serving as a reaction product is discharged from the anode, and product water serving as a reaction product is discharged from a cathode. As compared to hydrogen, methanol aqueous solution has higher energy per unit volume and a lower risk of explosion or the like and is suitable for storage. Thus, the DMFC is expected to be employed as a power source for an automobile, a portable device, and the like.

In such fuel cells, water is formed by an electrochemical reaction (a reaction for power generation). A compact fuel cell (a so-called passive type fuel cell) utilizing spontaneous diffusion of fuel and air is expected to be employed in portable devices such as a cellular phone, a notebook type personal computer, a PDA, an MP3 player, a digital camera, and an electronic dictionary (book). Particularly, in the structure for such a compact fuel cell, the formed water is directly discharged to the outside as liquid or vapor together with discharge air, and the portable device itself or the outside thereof could get wet. In view of the above, in Japanese Patent Laid-Open Publication No. 2004-241363, a structure is employed in which the outer periphery of an air intake is covered with a water absorbent material to bring the water absorbent material into contact with a cathode where water is formed. In this manner, water is prevented from being discharged to the outside in a liquid state.

SUMMARY OF THE INVENTION

In the structure of Japanese Patent Laid-Open Publication No. 2004-241363, the water absorbent material is brought into direct contact with the outside of a portable device, and also the water held in the water absorbent material is subjected to the heat generated by a power generation unit. Thus, the absorbed water is easily heated to form water vapor and is discharged to the outside. In Japanese Patent Laid-Open Publication No. 2004-241363, hydrogen is employed as fuel. However, in the DMFC, methanol aqueous solution may pass through an electrolyte membrane to cause a reaction to occur on a cathode. In this case, the oxidation byproducts of methanol (formaldehyde, formic acid, and methyl formate) are likely to be generated. Therefore, the structure of the DMFC utilizing spontaneous diffusion of fuel and air has an advantage that air can be supplied to a cathode without employing air supply means such as a pump since an air intake directly contacts with the external environment. On the other hand, the structure of the DMFC has disadvantages that the exterior of a portable device equipped with the DMFC or an area contacting therewith gets wet and that unreacted methanol and the oxidation byproducts of methanol are discharged to the outside.

The present invention has been made in view of the above problems, and it is an object of the invention to provide a fuel cell system in which the amount of a reaction product discharged outside the system can be reduced, the reaction product, such as water, being formed by the electrochemical reaction of a fuel cell.

In order to achieve the above object, one of the aspects of the present invention provides a fuel cell power generation apparatus comprising a fuel cell which generates electricity from fuel and oxygen in air, and a case which contains the fuel cell therein, the case having an air intake port which takes in air to be supplied to the fuel cell and an emitted material discharge port which discharges an emitted material emitted from the fuel cell. In this fuel cell power generation apparatus, the air intake port and the emitted material discharge port are arranged in different positions of the case. In this manner, the emitted material can be discharged from the fuel cell without disturbing the supply of air to the fuel cell.

In the fuel cell power generation apparatus of the above aspect, an air ventilation unit which ventilates air from the air intake port to the emitted material discharge port may be provided. In the fuel cell power generation apparatus of the above aspect, the air ventilation unit is a fan.

In this manner, the following effects can be obtained in addition to the abovedescribed effect: The roles for the air intake port which takes in air and the emitted material discharge port which discharges the emitted material can be separated as much as possible. When the air ventilation unit is a fan, the fuel cell and the peripheral components thereof can also be cooled.

Moreover, in the fuel cell power generation apparatus of the above aspect, a condensation unit which condenses the emitted material emitted from the fuel cell may be provided. In this aspect, an emitted material discharge passage may be provided which connects the condensation unit to the emitted material discharge port to thereby allow the emitted material condensed by the condensation unit to flow to the emitted material discharge port. In this manner, the following effects can be obtained in addition to the effect obtained in the above aspect: The emitted material is prevented from being discharged in a gaseous state together with the discharge air. The condensed emitted material can be reliably discharged from the emitted material discharge port by providing the emitted material discharge passage connecting the condensation unit to the emitted material discharge port.

Another aspect of the present invention provides a fuel cartridge which is detachable from a fuel cell, comprises a fuel storage unit which stores fuel to be supplied to the fuel cell and provided with a fuel supply port which is connected to the fuel storage unit for supplying the fuel to the fuel cell. The fuel cartridge further comprises a removal unit which removes, from the emitted material emitted from the fuel cell, water contained in the emitted material. In this manner, at least the amount of water discharged outside the system can be reduced, the water being formed by the electrochemical reaction of the fuel cell. Further, when the fuel cartridge is replaced, the removal unit can also be replaced.

In the fuel cartridge of the above aspect, the removal unit may be provided with an emitted material intake port. The emitted material intake port is provided at a position facing to the emitted material discharge port to which the emitted material is discharged from the fuel cell and introduces the emitted material to the removal unit. In this manner, in addition to the effects obtained in the above aspect, the emitted material can be reliably introduced to the removal unit.

In the fuel cartridge of the above aspects, a partitioning member may be provided which is provided between the removal unit and the fuel storage unit and changes its position by a volume change of the removal unit. In this manner, the following effects can be obtained in addition to the effects obtained in the above aspects: The fuel can be pressurized to be fed from the fuel storage unit to the fuel cell. Since the pressurizing force depends on the volume change of the removal unit or the amount of the emitted material emitted through the electrochemical reaction of the fuel cell, the fuel can be fed in an amount proportional to the amount of methanol consumed in the fuel cell.

In the fuel cartridge of the above aspects, the removal unit may comprise an adsorbent capable of adsorbing a component included in the emitted material. In the fuel cartridge of the above aspects, the fuel may contain methanol. In this manner, the following effects can be obtained in addition to the effects obtained in the above aspects: Since the removal unit includes the adsorbent, the removed (adsorbed) emitted material is prevented from being released outside the system upon replacement. Since the storage is easy, the fuel cartridge is suitable for carrying.

Still another aspect of the present invention provides a fuel cell system comprises a fuel cell power generation apparatus and a fuel cartridge.

The fuel cell power generation apparatus includes: a fuel cell which generates electricity from fuel and oxygen in air; and a case which contains the fuel cell therein, the case having an air intake port which takes in air to be supplied to the fuel cell and an emitted material discharge port which discharges an emitted material emitted from the fuel cell, the air intake port and the emitted material discharge port being arranged in different positions of the case. The fuel cartridge is provided to the fuel cell in a detachable manner and comprises a fuel storage unit which stores fuel to be supplied to the fuel cell and a fuel supply port connected to the fuel storage unit for supplying the fuel to the fuel cell. The fuel cartridge further comprises a removal unit which removes, from the emitted material emitted from the fuel cell, water contained in the emitted material. In this manner, the amount of a reaction product discharged outside the system can be reduced, the reaction product such as water being formed by the electrochemical reaction of the fuel cell.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

First Embodiment

Figure 1:
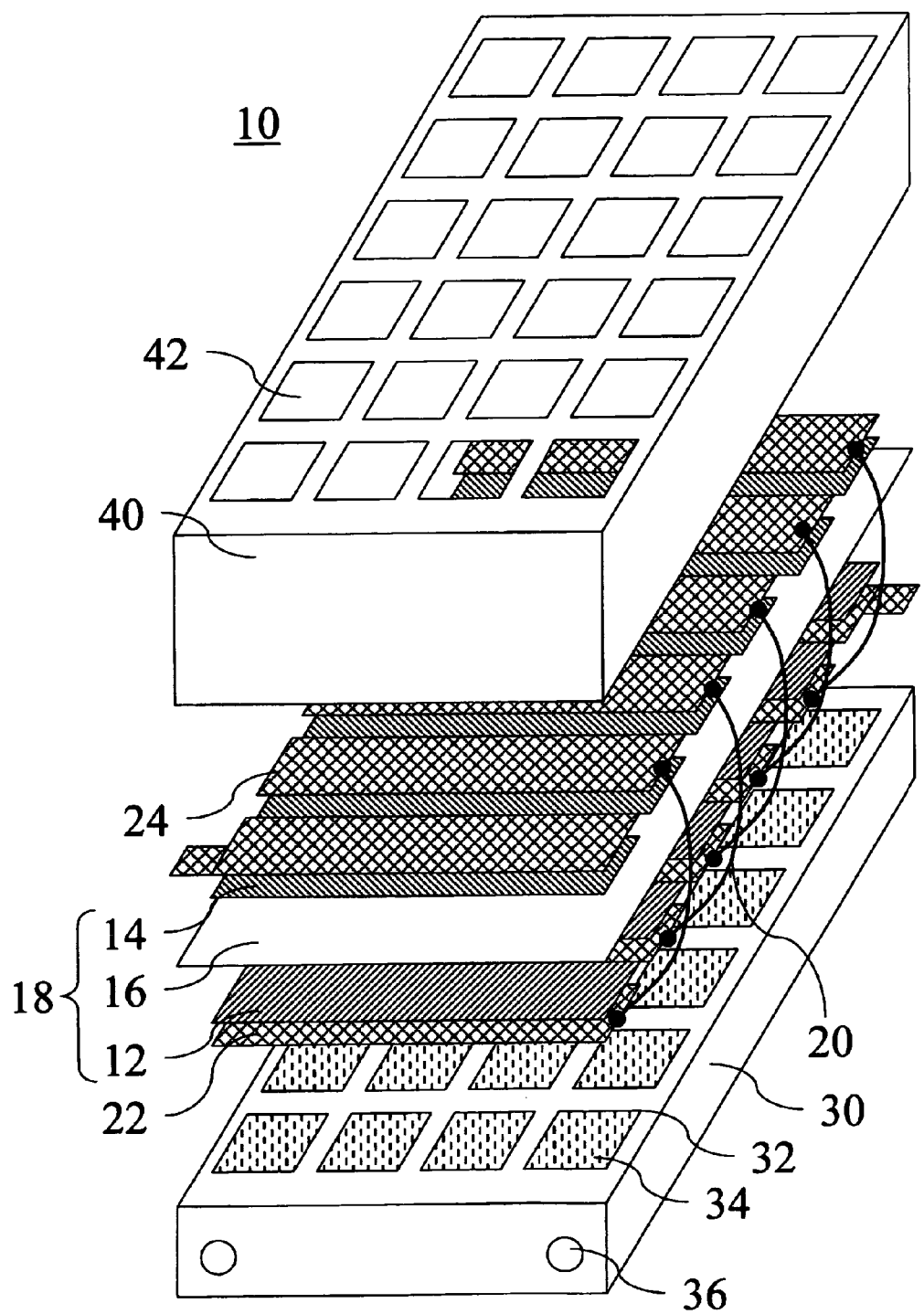
FIG. 1 is an exploded perspective view showing the basic construction of a fuel cell power generation apparatus according to a first embodiment.

The basic construction of a fuel cell power generation apparatus 10 according to a first embodiment will be described with reference to FIG. 1.

The fuel cell power generation apparatus 10 comprises a DMFC power generation unit 18, collectors 22 and 24, a connection wire 20, a methanol fuel storage unit 30, a wick material 34, and a case 40. The DMFC power generation unit 18 generates electric power through the electrochemical reaction of methanol with oxygen in air and comprises an anode 12, a cathode 14, and an electrolyte membrane 16 held between the anode 12 and the cathode 14. Methanol aqueous solution or pure methanol (hereinafter, denoted as "methanol fuel") is supplied to the anode 12 through capillary action, and air is supplied to the cathode 14. The connection wire 20 connects the collectors to one another such that a plurality of the power generation units are connected in series. The methanol fuel storage unit 30 stores the methanol fuel to be supplied to the anode 12. The wick material 34 supplies the methanol fuel from the methanol fuel storage unit 30 to the anode 12, and the case 40 has an air intake 42. The inside of the methanol fuel storage unit 30 is filled with the wick material 34, and the methanol fuel is supplied from the methanol fuel storage unit 30 to the anode 12 through the capillary action of the wick material 34.

Figure 2:
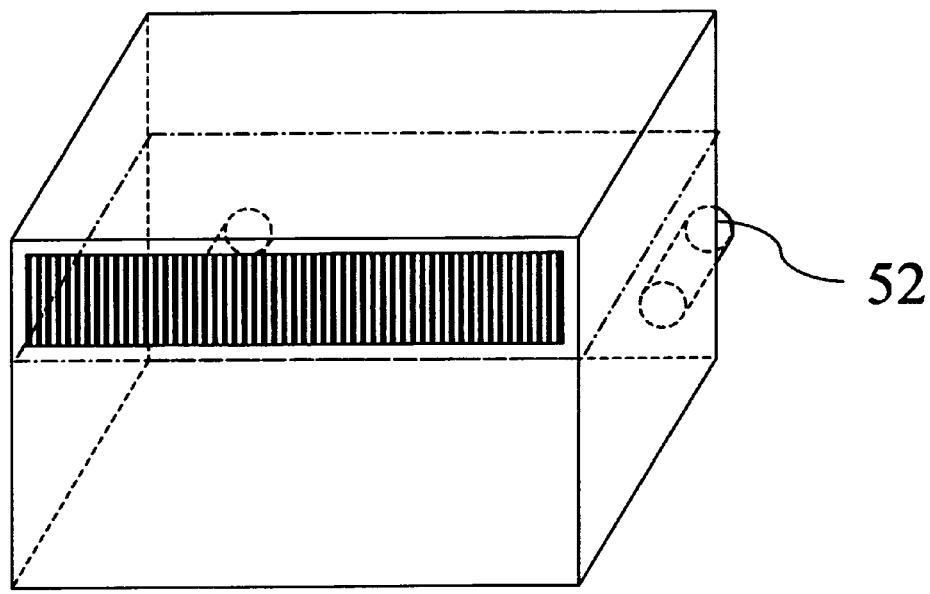
FIG. 2 is a perspective view showing the basic construction of a fuel cartridge according to the first embodiment.

FIG. 2 shows the basic construction of a fuel cartridge 50. The inside of the fuel cartridge 50 is filled with pure methanol or methanol aqueous solution having a concentration higher than that of the methanol fuel. By connecting a fuel cartridge fuel supply port 52 to a fuel cartridge connection port 36 shown in FIG. 1, the methanol fuel storage unit 30 can be refilled with the methanol fuel.

The DMFC power generation unit 18 is constituted by the anode 12 containing a proton conductor and a catalyst for oxidizing methanol, the electrolyte membrane 16, and the cathode 14 containing a proton conductor and a catalyst for reducing oxygen. These electrodes 12 and 14 are formed on the electrolyte membrane 16 and are fabricated by joining by means of hot press or other method. In order to improve fuel diffusion and a current collection function, each of the electrodes 12 and 14 may contain a conductive diffusion layer such as carbon paper or woven fabric, in addition to the catalyst and the proton conductor. The collectors 22 and 24 have a porous structure having electrical conductivity and corrosion resistance and allowing the diffusion of air and methanol serving as fuel.

The wick material 34 is a material absorbing liquid through capillary action and is generally formed of a porous material or a layer of particles. For example, the wick material 34 is formed of a hydrophilic absorbent material capable of absorbing water. Examples of the applicable absorbent material include polymer materials such as crosslinked polyacrylate based polymers, isobutylene-maleate based polymers, starch-polyacrylate based polymers, PVA (polyvinyl alcohol)-polyacrylic based polymers, hydrolyzed acrylic fiber based polymers, and crosslinked PVA based polymers. Further, the wick material 34 desirably has a function for transporting the produced water to a predetermined isolated position for vaporization. Examples of such a material include porous metals, porous minerals, hydrophilic carbon, carbon paper, woven fabric, non-woven fabric, paper, pulp, polymer materials, natural fibers, and synthetic fibers, each having recesses on the surface thereof. Moreover, materials having high water absorbing properties and capable of providing capillary action are also suitable. For example, polyesters and other synthetic fibers may be employed. In addition, a polyester-nylon composite material may be employed which is a synthetic fiber formed by weaving, in a mesh, thread-like materials and having fine void regions in the cross-section with respect to the longer direction.

The principle of operation will next be described.

Pure methanol or a methanol aqueous solution having a concentration higher than that of the methanol fuel is supplied from the fuel cartridge 50 via the fuel cartridge fuel supply port 52 to the methanol fuel storage unit 30 shown in FIG. 1. The methanol fuel storage unit 30 is filled with the wick material 34. The methanol fuel is drawn by the capillary action of the wick material 34, passes through a fuel supply opening 32 and the collector 22, and diffuses to the anode 12. The diffused methanol is then oxidized on the catalyst. The proton obtained by the oxidation of the methanol diffuses into the proton conductor contained in the anode 12 and into the electrolyte membrane 16 and reaches the cathode 14. The electricity generated at the anode 12 reaches the collector 24 in the side of the cathode 14 via the collector 22.

On the other hand, oxygen in air supplied from the air intake 42 of the case 40 reaches the catalyst in the cathode 14 via the collector 24. The oxygen then receives the protons from the anode 12 and electrons and is reduced to form water. The electricity generated by the DMFC power generation unit 18, as described above, can be employed for directly driving a portable device by connecting the apparatus to the portable device or for charging a secondary battery or the like.

First Example

Figure 3:
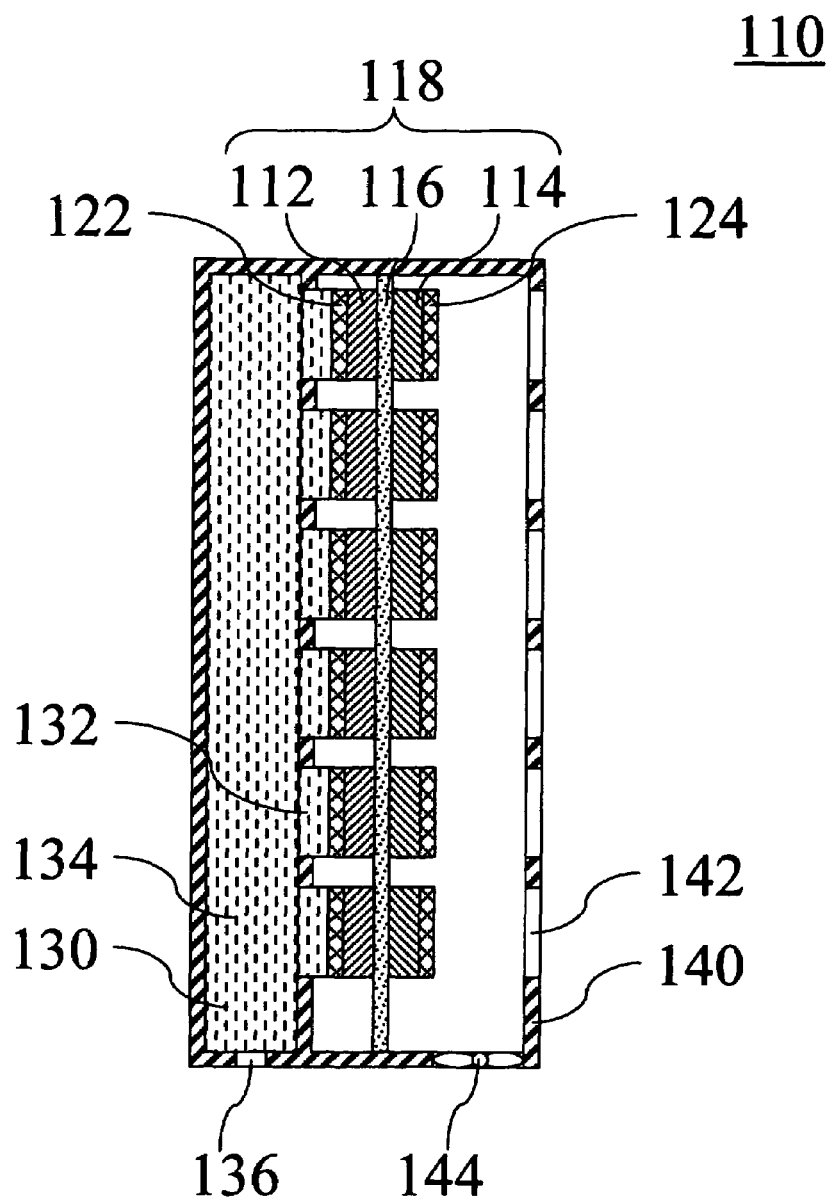
FIG. 3 is a cross-sectional view of a fuel cell power generation apparatus according to a first example of the first embodiment.
Figure 4:
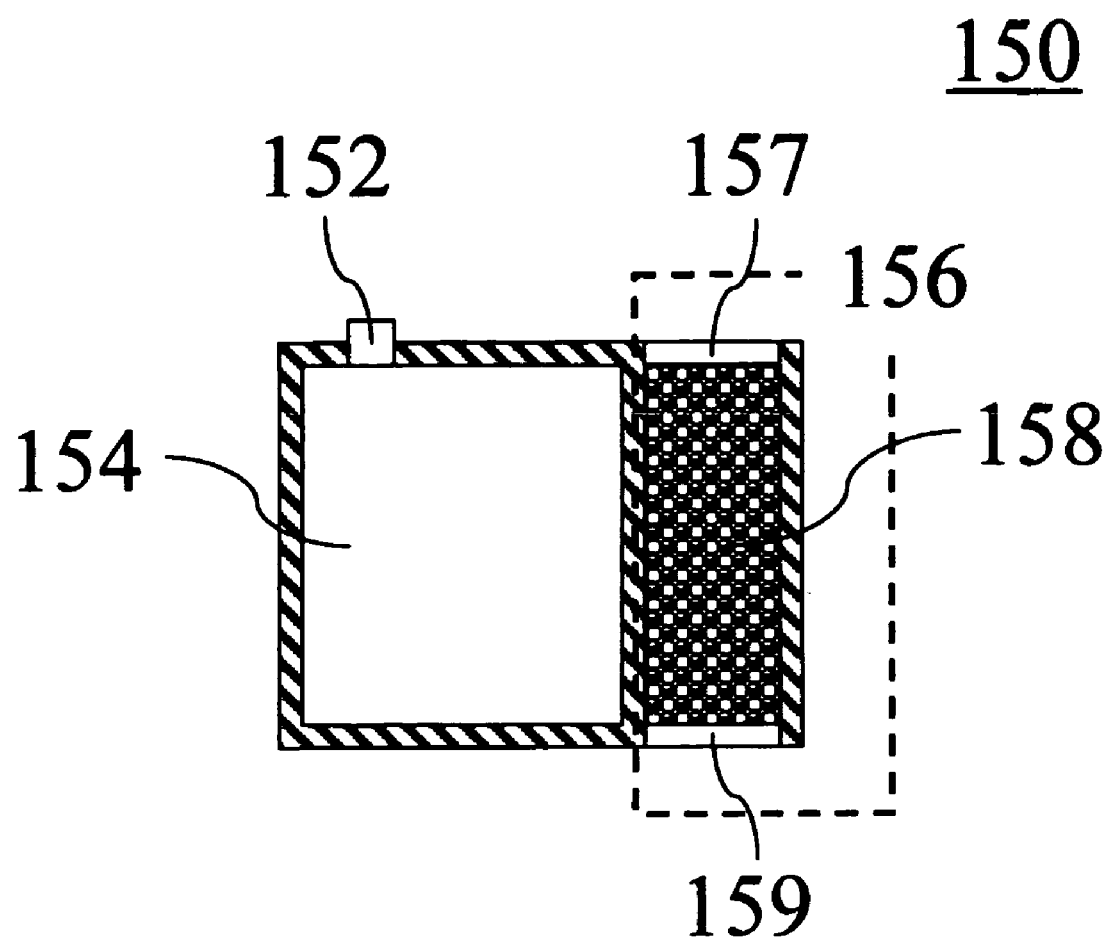
FIG. 4 is a cross-sectional view of a fuel cartridge according to the first example of the first embodiment.
Figure 5:
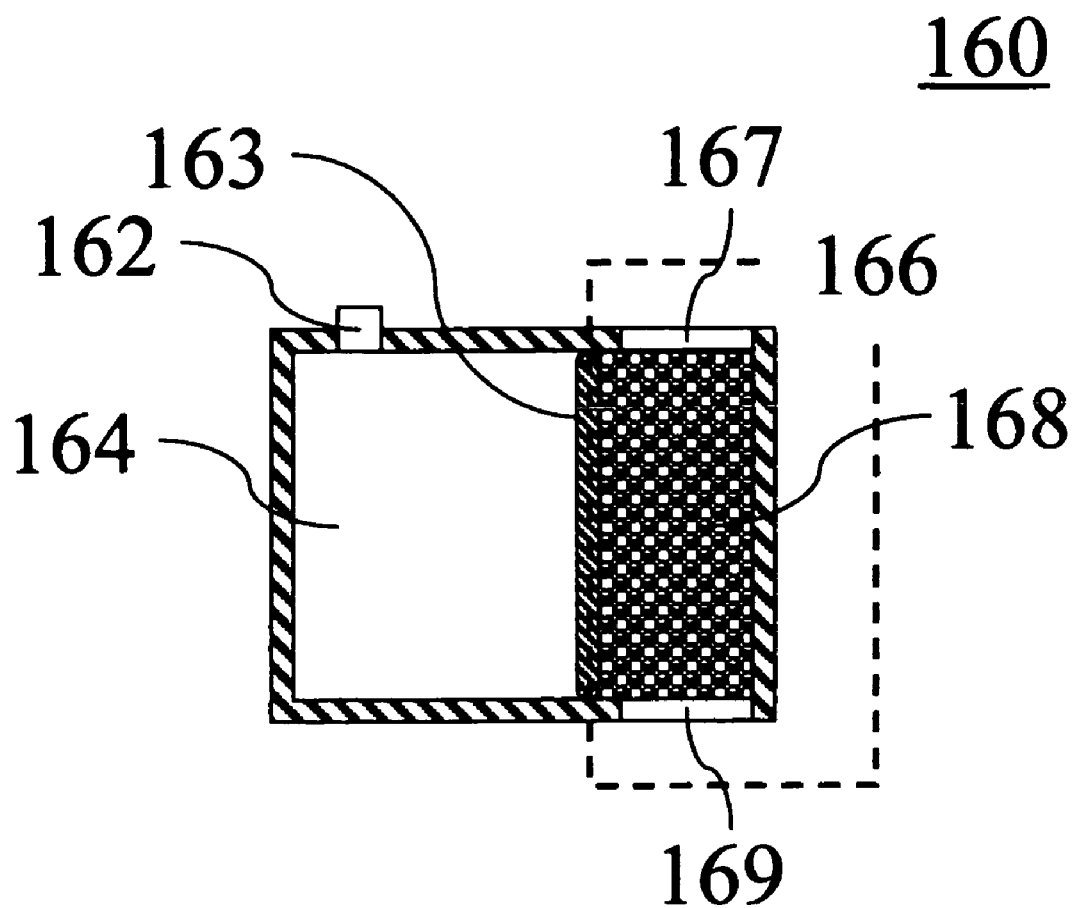
FIG. 5 is a cross-sectional view of a fuel cartridge according to another example of the first embodiment.
Figure 6:
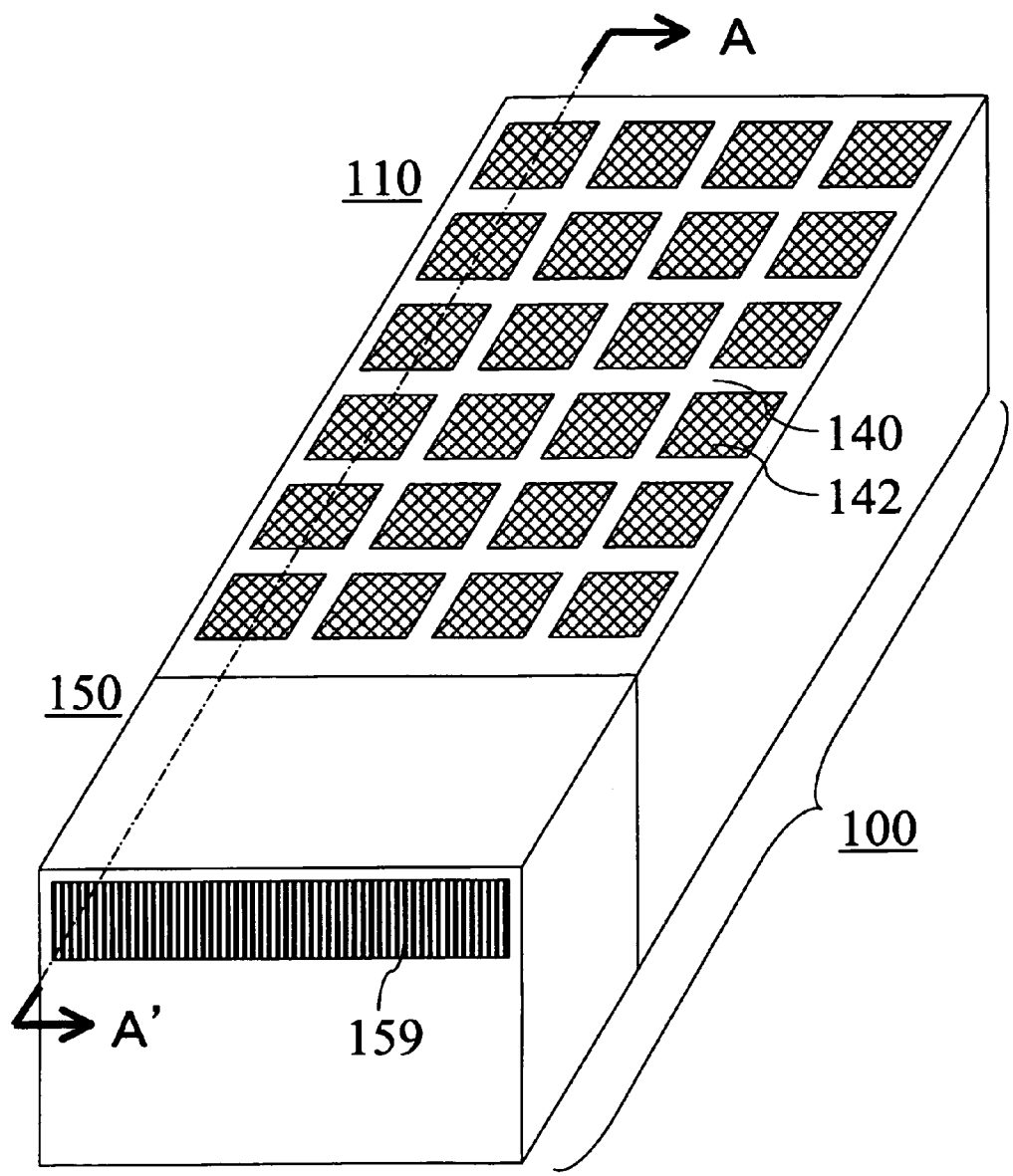
FIG. 6 is a perspective view of a fuel cell power generation system according to the first example of the first embodiment.

FIG. 3 is a cross-sectional view of a fuel cell power generation apparatus 110 of this example, and FIG. 4 is a cross-sectional view of a fuel cartridge 150. FIG. 6 is a perspective view of a fuel cell power generation system 100 formed by mounting the fuel cartridge 150 to the fuel cell power generation apparatus 110. FIGS. 3 and 4 and FIG. 5 to be described later are cross-sectional views of cross-section taken along the line A-A' of FIG. 6. The construction and the function of a wick material 134 and a DMFC power generation unit 118 are similar to those described above.

The fuel cell power generation apparatus 110 shown in FIG. 3 comprises the DMFC power generation unit 118, collectors 122 and 124, a methanol fuel storage unit 130, the wick material 134, and a case 140. The DMFC power generation unit 118 generates electric power through the electrochemical reaction of methanol with oxygen in air and comprises an anode 112, a cathode 114, and an electrolyte membrane 116 held between the anode 112 and the cathode 114. The methanol fuel is spontaneously supplied to the anode 112 through capillary action, and air is supplied to the cathode 114. The methanol fuel storage unit 130 stores the methanol fuel to be supplied to the anode 112. The wick material 134 supplies the methanol fuel from the methanol fuel storage unit 130 to the anode 112, and the case 140 has an air intake 142. This example is characterized in that the case 140 is provided with a fan 144 in the side to which the fuel cartridge 150 is connected.

FIG. 4 shows the structure of the fuel cartridge 150 comprising a fuel storage unit 154 and a reaction product removal unit 156. The inside of the fuel storage unit 154 is filled with pure methanol or methanol aqueous solution having a concentration higher than that of the methanol fuel. By connecting a fuel cartridge fuel supply port 152 to a fuel cartridge connection port 136 shown in FIG. 3, the methanol fuel storage unit 130 can be refilled with the pure methanol or the high concentration methanol aqueous solution.

The air to be discharged contains water and the oxidation byproducts of methanol (formaldehyde, formic acid, and methyl formate) formed at the cathode 114 by the electrochemical reaction in the DMFC power generation unit 118 and also contains unreacted methanol. This discharge air is suppressed from being discharged from the air intake 142 to the outside since the inside of the case 140 is maintained at a negative pressure by the fan 144 and is discharged through the fan 144. The discharge air discharged from the fan 144 enters the reaction product removal unit 156 of the fuel cartridge 150 from an emitted material intake port 157. The discharge air diffuses into an adsorption unit 158 filled with an adsorbent capable of adsorbing reaction products such as the oxidation byproducts of methanol and is then discharged to the outside from a discharge air outlet port 159 of the fuel cartridge 150. At this time, the discharge air is discharged with the reaction products adsorbed by the adsorption unit 158 contained in the reaction product removal unit 156. In this manner, the content of the reaction products in the discharge air discharged to the outside can be reduced.

FIG. 5 shows a fuel cartridge 160 of another aspect. The main difference between this cartridge 160 and the fuel cell cartridge 150 shown in FIG. 4 is that a deformable or movable partitioning member 163 is provided between a fuel storage unit 164 and a reaction product removal unit 166 in this cartridge 160. When an adsorption unit 168 contained in a reaction product removal unit 166 is expanded and deformed by the adsorption, the partitioning member 163 is pressed and moved toward the side of a fuel storage unit 164. Due to this action of the partitioning member 163, the methanol fuel can be fed to the methanol fuel storage unit 130. Further, the discharge air discharged from the fan 144 enters the reaction product removal unit 166 of the fuel cartridge 160 from an emitted material intake port 167. The discharge air diffuses into the adsorption unit 168 filled with an adsorbent capable of adsorbing reaction products such as the oxidation byproducts of methanol and is then discharged to the outside from a discharge air outlet port 169 of the fuel cartridge 160. At this time, the discharge air is discharged with the reaction products adsorbed by the adsorption unit 168 contained in the reaction product removal unit 166. In this manner, the content of the reaction products can be reduced in the discharge air discharged to the outside.

Any material may be employed for a material constituting the adsorption unit 168, so long as it can adsorb or store the products formed by the power generation (water, formaldehyde, formic acid, methyl formate, and methanol) and contained in the discharge air. Examples of such a material include: adsorption materials having a large surface area such as zeolites, activated carbon, and silica gel; sepiolite; 2,4-dinitrophenylhydrazine which stabilizes aldehydes by reaction; and calcium hydroxide, in addition to the same water absorbent materials as the wick material.

Second Example

Figure 7:
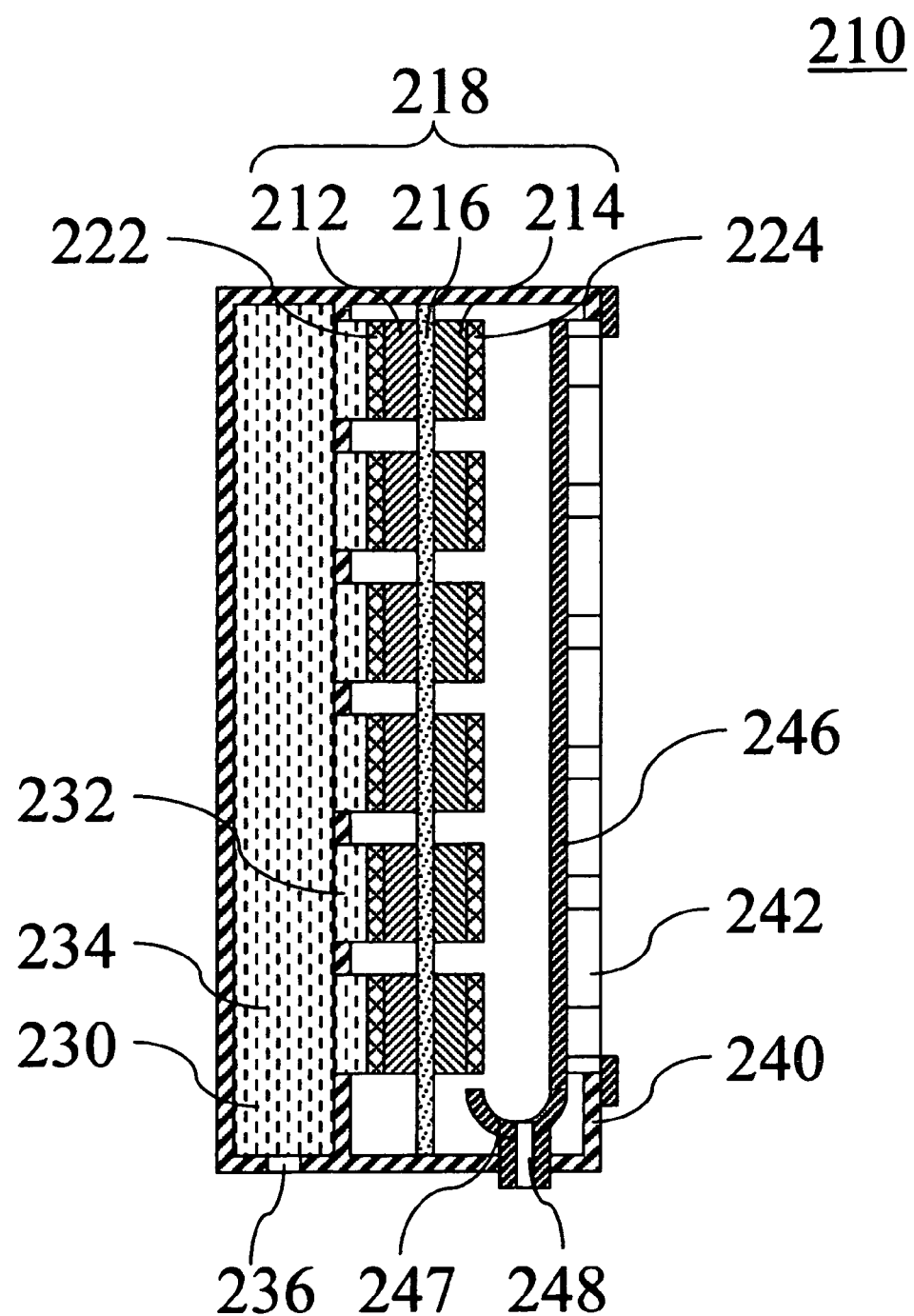
FIG. 7 is a cross-sectional view of a fuel cell power generation apparatus according a second example of the first embodiment.
Figure 8:
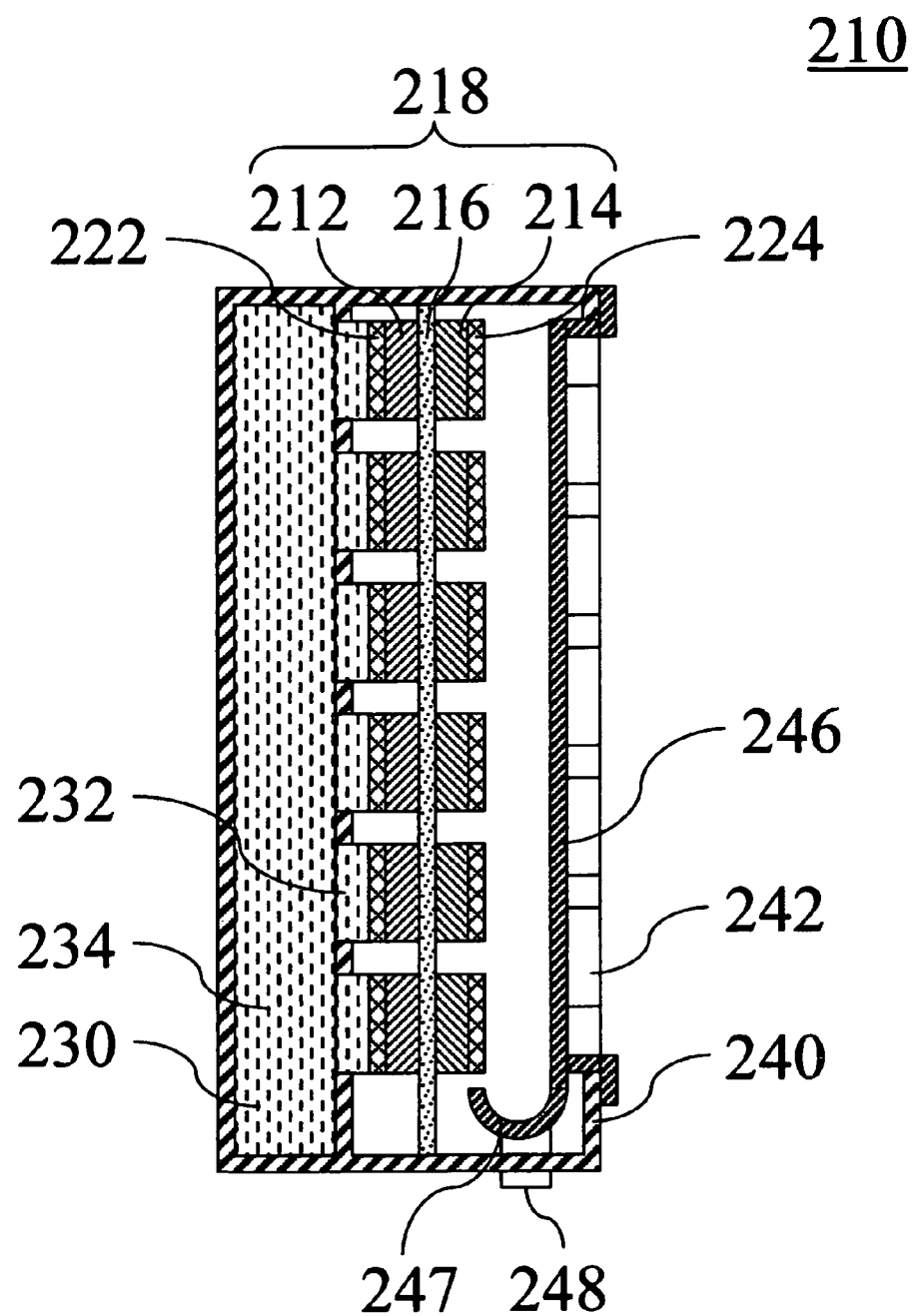
FIG. 8 is a cross-sectional view of another cross-section, different from that of FIG. 7, of the fuel cell power generation apparatus according the second example of the first embodiment.
Figure 9:
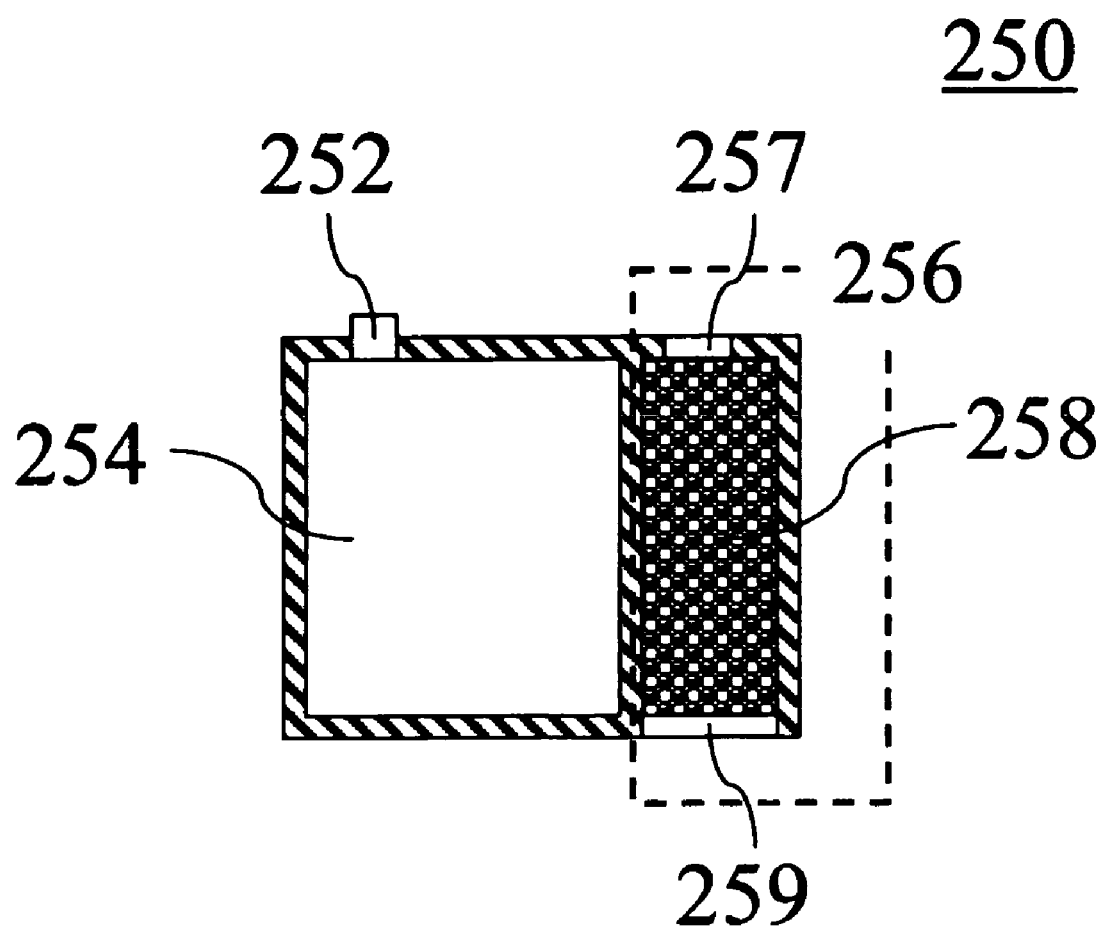
FIG. 9 is a cross-sectional view of a fuel cell cartridge according to the second example of the first embodiment.
Figure 10:
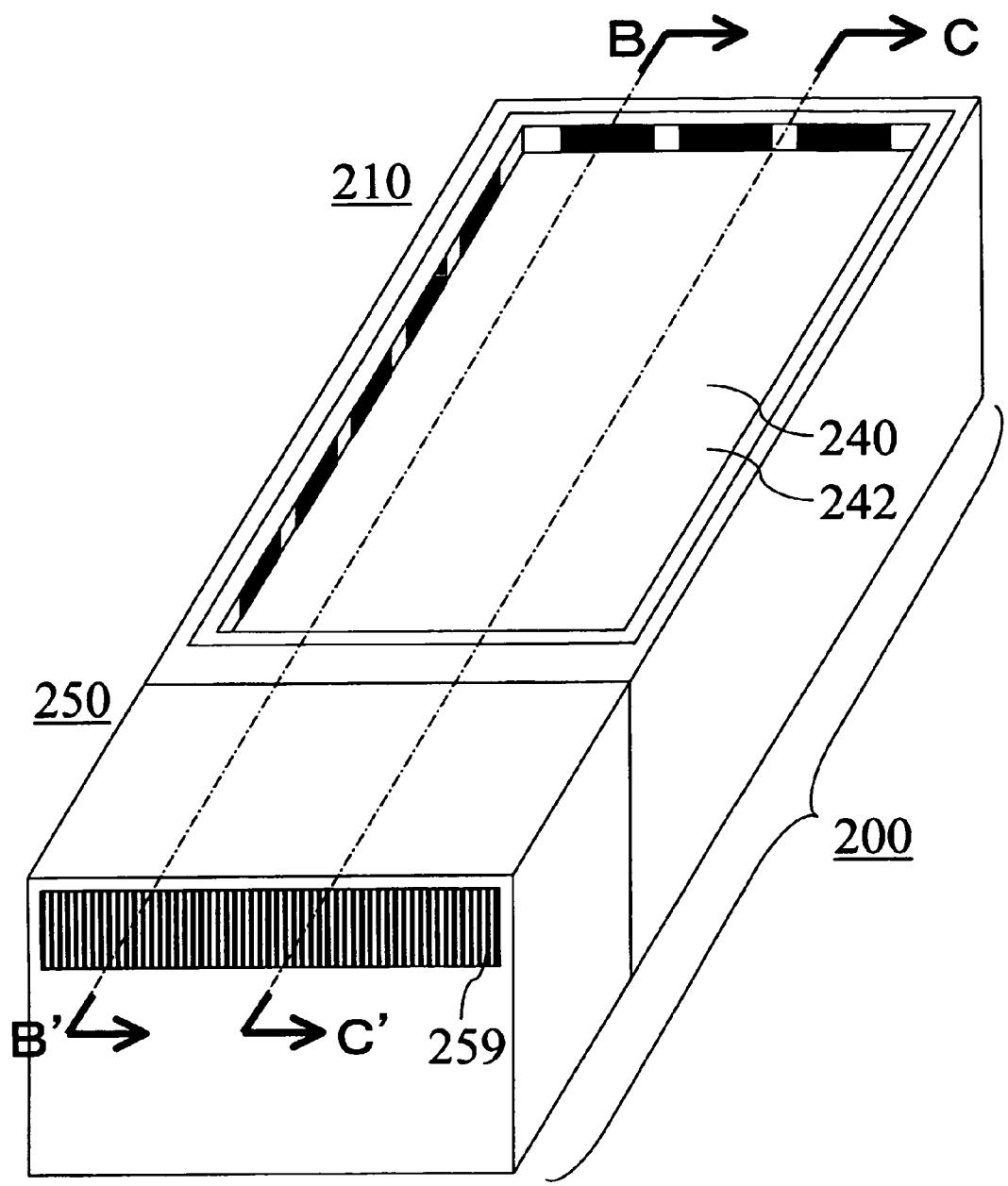
FIG. 10 is a perspective view of a fuel cell power generation system according to the second example of the first embodiment.

FIGS. 7 and 8 are cross-sectional views of a fuel cell power generation apparatus 210 of this example, and FIG. 9 is a cross-sectional view of a fuel cell cartridge 250. FIG. 10 is a perspective view of a fuel cell power generation system 200 formed by mounting the fuel cartridge 250 to the fuel cell power generation apparatus 210. FIGS. 7 and 8 are cross-sectional views of cross-sections B-B' and C-C', respectively, of FIG. 10. The construction of a wick material 234 of this Example and the construction of the fuel cell cartridge 250 are the same as those in the first example. Also, the construction and the function of a DMFC power generation unit 218 are the same as those of the abovedescribed DMFC power generation unit 18.

The fuel cell power generation apparatus 210 shown in FIGS. 7 and 8 comprises the DMFC power generation unit 218, collectors 222 and 224, a methanol fuel storage unit 230, the wick material 234, and a case 240. The DMFC power generation unit 218 generates electric power through the electrochemical reaction of methanol with oxygen in air and comprises an anode 212, a cathode 214, and an electrolyte membrane 216 held between the anode 212 and the cathode 214. The methanol fuel is supplied to the anode 212 through capillary action, and air is supplied to the cathode 214. The methanol fuel storage unit 230 stores the methanol fuel to be supplied to the anode 212. The wick material 234 supplies the methanol fuel from the methanol fuel storage unit 230 to the anode 212. This Example is characterized in that a heat radiation member 246 connected with the outside of the case 240 is provided inside the case 240 (in the side of the power generation unit 218). This Example is also characterized in that a tubular passage (an emitted material discharge passage) 248 is provided which is connected to a liquid pool 247 of the heat radiation member 246.

FIG. 9 shows the structure of the fuel cartridge 250 comprising a fuel storage unit 254 and a reaction product removal unit 256. The inside of the fuel storage unit 254 is filled with pure methanol or methanol aqueous solution having a concentration higher than that of the methanol fuel. By connecting a fuel cartridge fuel supply port 252 to a fuel cartridge connection port 236 shown in FIGS. 7 and 8, the methanol fuel storage unit 230 can be refilled with the pure methanol or the high concentration methanol aqueous solution.

The air to be discharged contains water and the oxidation byproducts of methanol (formaldehyde, formic acid, and methyl formate) formed at the cathode 214 by the electrochemical reaction in the DMFC power generation unit 218 and also contains unreacted methanol. This discharge air is condensed on the inner side of the heat radiation member 246 (in the side of the power generation unit 218) formed in connection with the outside of the case 240. The condensed liquid of the discharge air falls along the heat radiation member 246 under gravity and is collected in the liquid pool of the heat radiation member 246. Subsequently, the collected liquid is discharged from the connected tubular passage 248 to the outside of the case. The discharged liquid enters the reaction product removal unit 256 from an emitted material intake port 257 of the fuel cartridge 250. The discharged liquid is adsorbed by an adsorption unit 258 filled with an adsorbent capable of adsorbing reaction products such as the oxidation byproducts of methanol. The non-condensed discharge air is discharged via an air intake 242 to the outside. In this manner, the content of the reaction products can be reduced in the discharge air discharged to the outside.

In this Example, any method may be employed as means for collecting the liquid condensed at the radiation member 246, so long as the liquid is led to the emitted material intake port 257 of the fuel cartridge 250. For example, a structure may be employed in which a water absorbing material is arranged between the heat radiation member 246 and the emitted material intake port 257 of the fuel cartridge 250. Moreover, another structure may be employed which does not have a liquid pool and has a heat radiation member continuously extending to the emitted material intake port 257 of the fuel cartridge 250.

As in the first example, any material may be employed for a material constituting the adsorption unit 258, so long as it can adsorb or store the products formed by the power generation (water, formaldehyde, formic acid, methyl formate, and methanol) and contained in the discharge air. Examples of such a material include: adsorption materials having a large surface area such as zeolites, activated carbon, and silica gel; sepiolite; 2,4-dinitrophenylhydrazine which stabilizes aldehydes by reaction; and calcium hydroxide, in addition to the same water absorbent materials as the wick material.

Third Example

Figure 11:
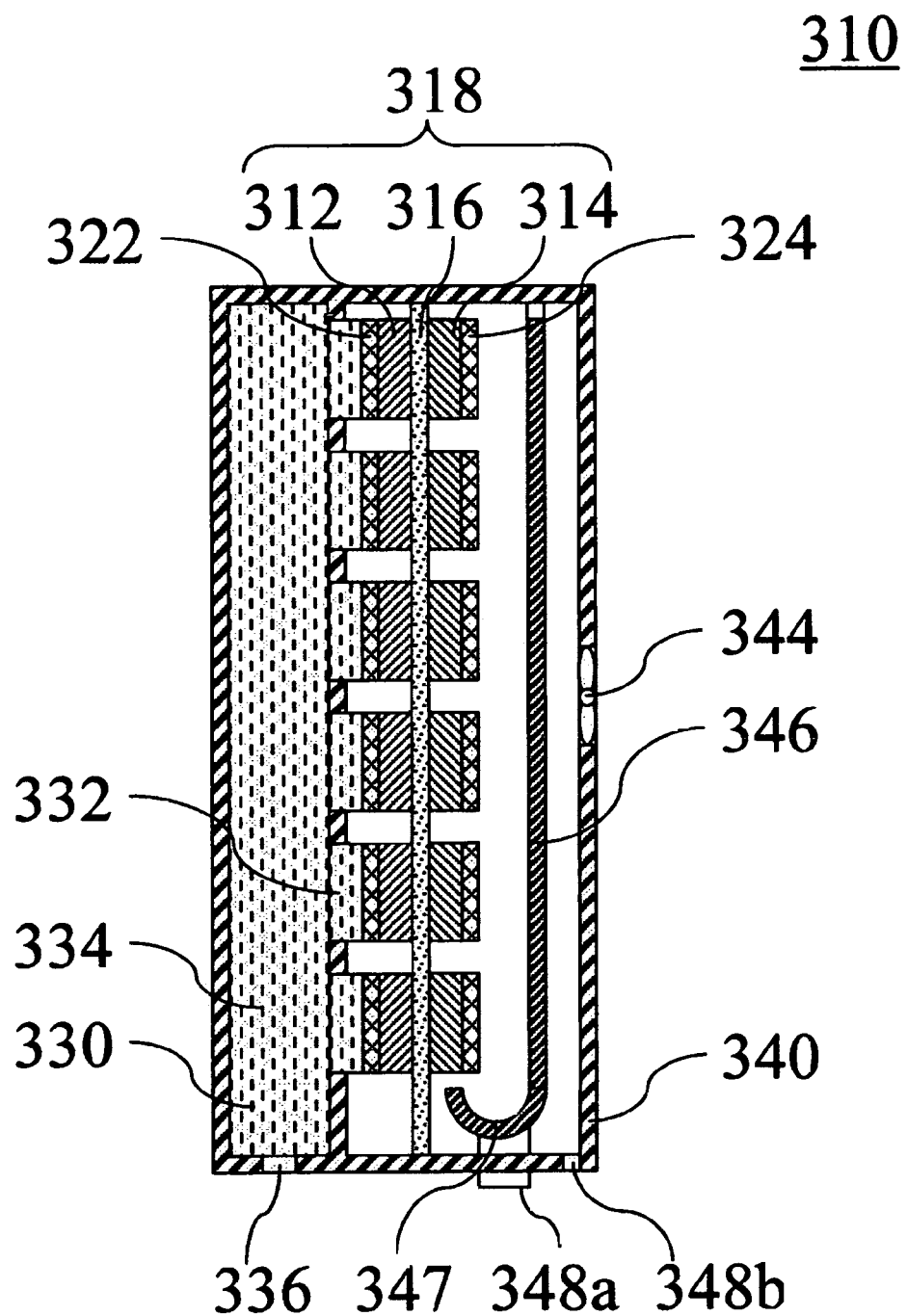
FIG. 11 is a cross-sectional view of a fuel cell power generation apparatus according to a third example of the first embodiment.
Figure 12:
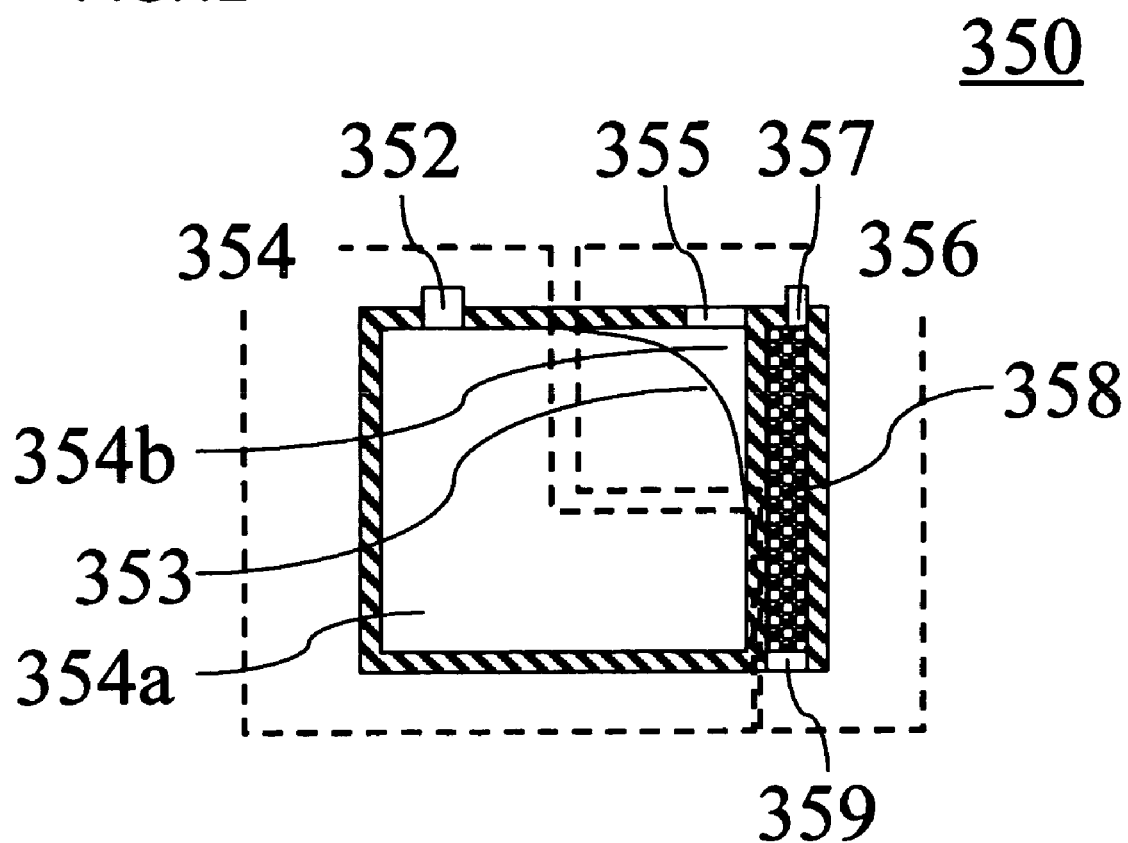
FIG. 12 is a cross-sectional view of a fuel cartridge according to the third example of the first embodiment.

FIG. 11 is a cross-sectional view of a fuel cell power generation apparatus 310 of this Example, and FIG. 12 is a cross-sectional view of a fuel cartridge 350. A wick material 334 and a DMFC power generation unit 318 of this Example have the same structure and the same function as those of the abovedescribed wick material 334 and the abovedescribed DMFC power generation unit 18, respectively.

The fuel cell power generation apparatus 310 shown in FIG. 11 comprises the DMFC power generation unit 318, collectors 322 and 324, a methanol fuel storage unit 330, the wick material 334, and a case 340. The DMFC power generation unit 318 generates electric power through the electrochemical reaction of methanol with oxygen in air and comprises an anode 312, a cathode 314, and an electrolyte membrane 316 held between the anode 312 and the cathode 314. The methanol fuel is supplied to the anode 312 through capillary action, and air is supplied to the cathode 314 by a fan 344. The methanol fuel storage unit 330 stores the methanol fuel to be supplied to the anode 312. The wick material 334 supplies the methanol fuel from the methanol fuel storage unit 330 to the anode 312. This Example is characterized in that a heat radiation member 346, a tubular passage (an emitted material discharge passage) 348a, and the fan 344 are provided. The heat radiation member 346 is of a size capable of covering almost all the electrodes and is provided inside the case 340 (in the side of the power generation unit 318). The tubular passage 348a is connected to a liquid pool 347 of the heat radiation member 346, and the fan 344 facilitates air supply and is disposed between the heat radiation member 346 and the case 340.

FIG. 12 shows the structure of the fuel cartridge 350 comprising a fuel storage unit 354 and a reaction product removal unit 356. The inside of the fuel storage unit 354 is filled with pure methanol or methanol aqueous solution having a concentration higher than that of the methanol fuel. By connecting a fuel cartridge fuel supply port 352 to a fuel cartridge connection port 336 shown in FIG. 11, the methanol fuel storage unit 330 can be refilled with the pure methanol or the high concentration methanol aqueous solution.

The air to be discharged contains water and the oxidation byproducts of methanol (formaldehyde, formic acid, and methyl formate) formed at the cathode 314 by the electrochemical reaction in the DMFC power generation unit 318 and also contains unreacted methanol. This discharge air is condensed on the inner side of the heat radiation member 346 (in the side of the power generation unit 318) cooled sufficiently by the wind from the fan 344. The condensed liquid of the discharge air falls along the heat radiation member 346 under gravity and is collected in the liquid pool 347 of the heat radiation member 346. Subsequently, the collected liquid passes through the emitted material discharge passage 348a connected to the liquid pool 347 and is discharged to a discharge port outside the case. The discharged liquid is stored in a fuel cartridge discharged liquid storage unit 354b via a discharged liquid intake port 355 of the fuel cartridge 350. The fuel cartridge discharged liquid storage unit 354b is separated from a methanol fuel storage unit 354a by a deformable partitioning membrane 353. The methanol fuel in the fuel cartridge can be fed to the methanol fuel storage unit 330 with the help of the deformation of the deformable partitioning membrane 353, which deformation serves as a driving force.

On the other hand, the non-condensed discharge air enters the reaction product removal unit 356 from an emitted material intake port 357 via a discharge port (an emitted material discharge passage) 348b. The non-condensed discharge air diffuses into an adsorption unit 358 filled with a material capable of adsorbing reaction products such as the oxidation byproducts of methanol and is then discharged from a fuel cartridge discharge air discharge port 359. In this manner, the content of the reaction products can be reduced in the discharge air discharged to the outside.

In this example, any method may be employed as means for collecting the liquid condensed at the radiation member 346, so long as the liquid is led to the discharged liquid intake port 355 of the fuel cartridge 350. For example, a structure may be employed in which a water absorbing material is arranged between the heat radiation member 346 and the discharged liquid intake port 355 of the fuel cartridge 350. Moreover, another structure may be employed which does not have a liquid pool and has a heat radiation member continuously extending to the emitted material intake port 357 of the fuel cartridge 350.

As in the first and second examples, any material may be employed for a material constituting the adsorption unit 358, so long as it can adsorb or store the products formed by the power generation (water, formaldehyde, formic acid, methyl formate, and methanol) and contained in the discharge air. Examples of such a material include: adsorption materials having a large surface area such as zeolites, activated carbon, and silica gel; sepiolite; 2,4-dinitrophenylhydrazine which stabilizes aldehydes by reaction; and calcium hydroxide, in addition to the same water absorbent materials as the wick material.

In the best mode for carrying out the invention, the description has been made with reference to the DMFC in which methanol serving as fuel is directly supplied, but the present invention is not limited thereto. The invention is useable in a portable fuel cell or a vehicle-mounted fuel cell in which hydrogen gas is supplied through a hydrogen cylinder or a hydrogen storage alloy.

Second Embodiment

Technical Field of the Second Embodiment

A second embodiment relates to a fuel cell. Specifically, the second embodiment relates to a fuel cell employed in a portable device and having antimicrobial functions.

(Description of the Related Art of the Second Embodiment)

A fuel cell is a device for generating electrical energy from hydrogen and oxygen and is capable of providing high power generation efficiency. One of the main features of a fuel cell is that high power generation efficiency can be expected even in small-scale systems since, in contrast to a conventional power generation method in which the power is generated via a thermal or kinetic energy process, the power is generated through direct power generation. Another feature is that environmental friendliness is excellent since the emission of nitrogen compounds and the like is low, and noise and vibrations are also small. As mentioned above, a fuel cell can effectively utilize the chemical energy contained in fuel and has environmentally friendly characteristics. Therefore, a fuel cell is expected to serve as an energy supply system of the 21st century and has received attention as a new promising power generation system usable in various applications including small to large scale power generation, for example, in space, automobile, and portable device applications. Thus, the technological development of a fuel cell for practical use is fully in progress.

Among various types of fuel cells, a proton-exchange membrane fuel cell can operate at lower temperatures and generate power at higher power densities as compared to other types of fuel cells. Particularly in recent years, a direct methanol fuel cell (DMFC) has received attention as a form of the proton-exchange membrane fuel cell. In the DMFC, methanol aqueous solution serving as a fuel is directly supplied to an anode without modification to obtain electric power through the electrochemical reaction of the methanol aqueous solution with oxygen. In this electrochemical reaction, carbon dioxide serving as a reaction product is discharged from the anode, and product water serving as a reaction product is discharged from a cathode. As compared to hydrogen, methanol aqueous solution has higher energy per unit volume and a lower risk of explosion or the like and is suitable for storage. Thus, the DMFC is expected to be employed as a power source of automobiles, portable devices (a cellular phone, a notebook type personal computer, a PDA, an MP3 player, a digital camera, and an electronic dictionary (book)), and the like.

A flat-shaped fuel cell disclosed in Japanese Patent Laid-Open Publication No. 2003-282131 is expected to be employed in a portable device requiring compactness and light weight. However, in this fuel cell, the product water from a cathode passes through a cathode product discharge aperture and is discharged directly, thereby causing sanitary problems and unpleasantness to a user. In view of the above, a technique for subjecting an object directly touched by a user to antimicrobial processing is disclosed in Japanese Patent Laid-Open Publication No. 2005-105053. Since the Japanese are very sanitary conscious, the development of such a technique is in progress.

(Disclosure of the Second Embodiment)

As described above, in a conventional fuel cell, the product water from a cathode passes through a cathode product discharge aperture and is discharged directly, thereby causing sanitary problems and unpleasantness to a user. Moreover, if water in a liquid form remains in the cathode product discharge aperture, the supply of reaction fluid such as air is disturbed, thereby causing a problem that the output of the fuel cell is lowered.

This embodiment has been made in view of the above problems. It is an object of this embodiment to provide a fuel cell which is sanitary and does not cause unpleasantness to a user. In this embodiment, this is achieved by providing a predetermined function to a case of the fuel cell and particularly to a portion provided with a ventilation aperture which allows a reaction fluid or a reaction product such as water (including water vapor), carbon dioxide, or air to ventilate.

In order to achieve the above object, an aspect of this embodiment provides a fuel cell comprising: a cell which has an anode, a cathode, and an electrolyte layer held between the anode and the cathode; and a case which contains the cell therein, wherein the case has an antimicrobial function. Here, the antimicrobial function is a function capable of suppressing the breeding of microorganisms such as bacteria. By decomposing a cell of a microorganism or a nutritional component (an organic material) required for a microorganism to breed, the breeding can be suppressed. In this manner, the fuel cell can be kept sanitary.

Another aspect of this embodiment provides a fuel cell comprising: a cell which has an anode, a cathode and an electrolyte layer held between the anode and the cathode; and a case which contains the cell therein, wherein the case has a hydrophilic function. Here, the hydrophilic function is a function for providing affinity with water. Specifically, the hydrophilic function can be provided by subjecting the case to hydrophilic processing such that the contact angle between the case and water (the angle between a flat surface of a solid and the free surface of a liquid when the liquid contacts with the solid) becomes 90° or less. In this manner, if a water droplet adheres to the case, the droplet is thinly spread and easily evaporates. Thus, a user can comfortably use the fuel cell. Further, if a water droplet adheres to a ventilation aperture which is provided in the case and allows a reaction fluid such as air or a reaction product such as carbon dioxide or product water to ventilate, the droplet is thinly spread. Thus, the ventilation aperture is not clogged and allows the reaction fluid or the reaction product to smoothly ventilate.

In the fuel cell of each of the above aspects, the case is provided with a cathode product discharge aperture which discharges a reaction product formed at the cathode. The cathode product discharge aperture may have the antimicrobial function and/or the hydrophilic function. In this manner, the antimicrobial function and/or the hydrophilic function is provided particularly in the cathode product discharge aperture from which product water serving as the reaction product is discharged and is also provided in the periphery thereof. Therefore, a fuel cell can be provided which is sanitary and does not cause unpleasantness to a user.

In the fuel cell of each of the above aspects, the case may contain a photocatalyst so as to be provided with the antimicrobial function and/or the hydrophilic function. Here, the photocatalyst is a material which absorbs optical energy to cause other materials which do not absorb light to be chemically reacted. When a photocatalyst is irradiated with light from the sun, a fluorescent tube, or the like, a strong oxidizing power is generated on the surface thereof, and thus the photocatalyst can decompose organic compounds or bacteria brought into contact therewith. Specific examples of the photocatalyst include titanium oxide, zinc oxide, tin oxide, iron oxide, zirconium oxide, tungsten oxide, chromium oxide, molybdenum oxide, ruthenium oxide, germanium oxide, lead oxide, cadmium oxide, copper oxide, vanadium oxide, niobium oxide, tantalum oxide, manganese oxide, rhodium oxide, nickel oxide, rhenium oxide, and strontium titanate. The photocatalyst may have both antimicrobial function and the hydrophilic function.

In the fuel cell of each of the above aspects, the fuel supplied to the anode may be a liquid fuel. Here, examples of the liquid fuel include methanol, ethanol, isopropyl alcohol, ethylene glycol, and dimethyl ether. Particularly, a DMFC which directly supplies methanol to an anode is expected to be employed as a power source for a portable device. In a portable device, a user frequently touches the case of a fuel cell, and thus the fuel cell having the antimicrobial function and/or the hydrophilic function is considered to be useful.

(Detailed Description of the Second Embodiment)

The basic construction of a fuel cell 1100 according to the second embodiment will be described with reference to the drawings.

Figure 13:
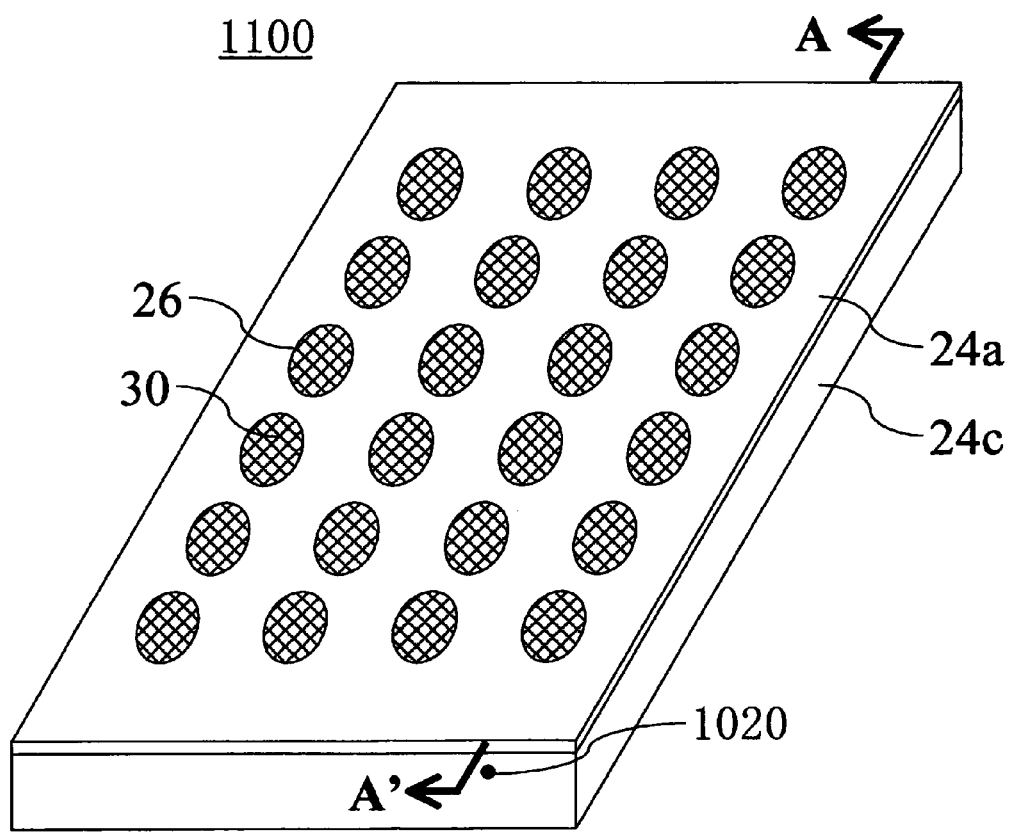
FIG. 13 is a schematic perspective view showing the appearance of a fuel cell according to a second embodiment.
Figure 14:
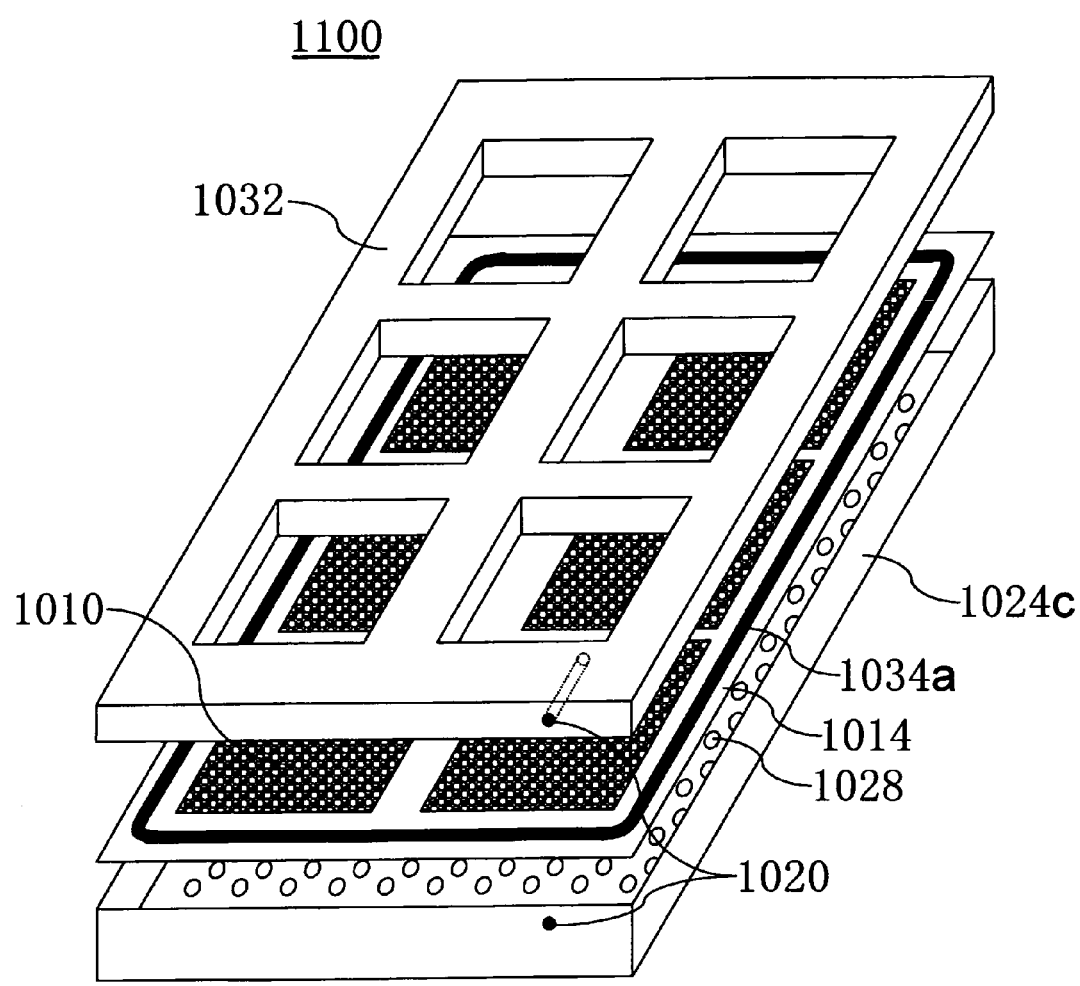
FIG. 14 is an exploded perspective view of the fuel cell according to the second embodiment.
Figure 15:
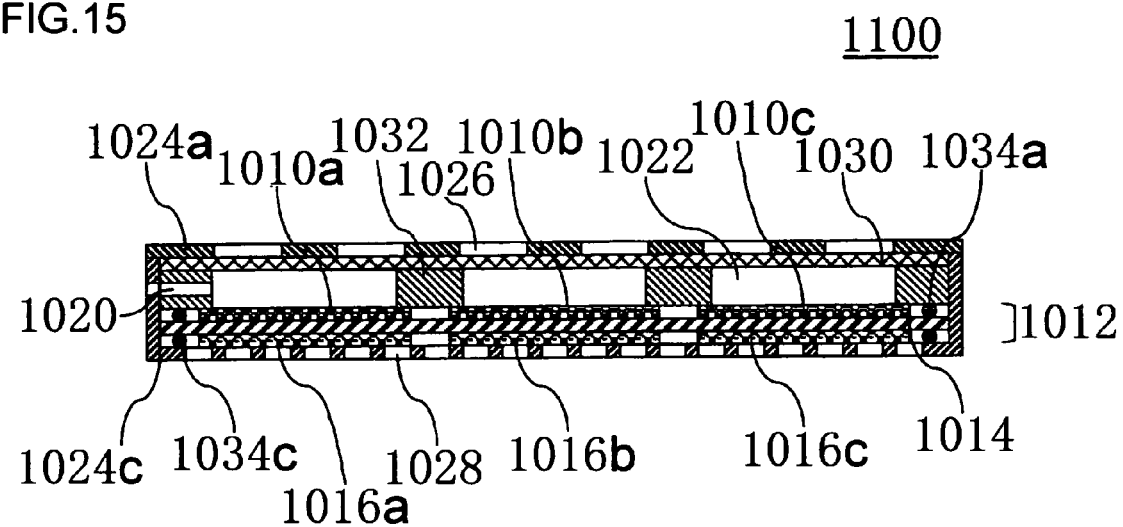
FIG. 15 is a schematic cross-sectional view showing the interior construction of the fuel cell according to the second embodiment.

FIG. 13 is a schematic perspective view showing the appearance of the fuel cell 1100 of the second embodiment, and FIG. 14 is an exploded perspective view of the fuel cell 1100 when a case 1024*a* of the anode side is removed. FIG. 15 is a schematic cross-sectional view taken along the line A-A' of FIG. 13 showing the interior structure of the fuel cell 1100. In this embodiment, the fuel cell 1100 is a DMFC in which a methanol aqueous solution or pure methanol (hereinafter, denoted as "methanol fuel") is supplied to anodes 1010. A membrane electrode assembly (MEA) 1012 serving as a power generation unit is formed by holding an electrolyte membrane 1014 between the anodes 1010 and cathodes 1016. In this embodiment, a plurality of anodes 1010 (1010*a*, 1010*b*, 1010*c*, etc) and a plurality of cathodes 1016 (1016*a*, 1016*b*, 1016*c*, etc) are arranged on one electrolyte membrane 1014 such that the anodes and the cathodes face to each other. In the MEA 1012, pairs of the anode and the cathode are connected in series by connecting, for example, the anode 1010*a* to the cathode 1016*b* by a connection wire (not shown) or the like.

The methanol fuel to be supplied to the anodes 1010 is supplied to fuel chambers 1022 from the outside of the fuel cell 1100 via a methanol fuel supply aperture 1020. The fuel chambers 1022 are in communication with one another, and the methanol fuel stored in each of the fuel chambers 1022 is supplied to each of the anodes 1010. At the anodes 1010, the reaction of methanol represented by the equation (1) occurs, and H$^+$ moves to the cathodes 1016 via the electrolyte membrane 1014, causing electric power to be generated.

$$CH_3OH+H_2O \rightarrow 6H^+ + CO_2 + 6e^- \tag{1}$$

As is clear from equation (1), carbon dioxide is formed at the anodes 1010 through this reaction. Hence, a liquid-vapor separation filter 1030 is arranged between the fuel chambers 1022 and an anode product discharge aperture 1026 provided in the case 1024*a* in the anode side of the fuel cell 1100.

This liquid-vapor separation filter 1030 is a planar filter having fine pores. This filter allows a gaseous component to selectively pass therethrough and does not allow a liquid component to pass therethrough. Any material having methanol (alcohol) resistance is suitable for a material for the liquid-vapor separation filter 1030. Examples of such a material include fluorine based synthetic resins such as polychlorotrifluoroethylene, polyvinylidene fluoride, polyvinyl fluoride, tetrafluoroethylene-ethylene copolymer, polytetrafluoroethylene (PTFE), tetrafluoroethylene-perfluoroalkylvinylether copolymer (PFA), tetrafluoroethylene-hexafluoropropylene copolymer (FPE), tetrafluoroethylene-ethylene copolymer (E/TFE), polyvinylidenefluoride (PVDF), polychlorotrifluoroethylene (PCTFE), chlorotrifluoroethylene-ethylene copolymer (E/CTFE), perfluoro cyclic polymer, and polyvinyl fluoride (PVF).

A suitable material for the case 1024 is light weight and has a high stiffness and corrosion resistance. Specific examples of such a material include synthetic resins such as acrylic resin, epoxy resin, glass-epoxy resin, silicon resin, cellulose, nylon, polyamide imide, polyallylamide, polyallyl ether ketone, polyimide, polyurethane, polyether imide, polyether ether ketone, polyether ketone ether ketone ketone, polyether ketone ketone, polyether sulfone, polyethylene, polyethylene glycol, polyethylene terephthalate, polyvinyl chloride, polyoxymethylene, polycarbonate, polyglycolic acid, polydimethylsiloxane, polystyrene, polysulfone, polyvinyl alcohol, polyvinyl pyrrolidone, polyphenylene sulfide, polyphthalamide, polybutylene terephthalate, polypropylene, polyvinyl chloride, polytetrafluoroethylene, and rigid polyvinyl chloride and metals such as aluminum alloys, titanium alloys, and stainless steels. In addition, tempered glass or skeleton resin may be employed. As in the liquid-vapor separation filter 1030, the case 1024 has a portion contacting with the methanol fuel. Therefore, it is desirable that a composite material formed by laminating the above synthetic resin or the above metal and the fluorine based synthetic resin be employed particularly in the portion contacting with the methanol fuel.

Moreover, a supporting member 1032 forms the fuel chambers 1022 and tightens the MEA 1012. The supporting member 1032 is also desirably formed of the same material as that employed for the portion of the case 1024 which portion contacts with the methanol fuel.

In this embodiment, the electrolyte membrane 1014 of the MEA 1012 is formed of Nafion 115 (product of DuPont). The anodes 1010 are formed on one of the surfaces of the electrolyte membrane 1014 by applying an anode catalyst paste prepared by mixing Pt—Ru black with 5 wt. % solution of Nafion (product of DuPont). The cathodes 1016 are formed on the other surface by applying a cathode catalyst paste prepared by mixing Pt black with 5 wt. % solution of Nafion (product of DuPont). In this embodiment, Nafion 115 is employed to form the electrolyte membrane 1014. However, any electrolyte membrane may be employed as the electrolyte membrane 1014, so long as it is an electrolyte membrane having ionic conductivity and a thickness of 50 to 200 µm. For the case of the DMFC employing the methanol fuel as in this embodiment, it is more desirable that the electrolyte membrane can prevent a phenomenon, so-called cross-leakage, in which methanol passes through the electrolyte membrane 1014 to move toward the cathode side. Further, in the employed method, the anodes 1010 and the cathodes 1016 are formed on the electrolyte membrane 1014. However, a collector in which a catalyst layer is formed on an electrode substrate such as carbon paper may be formed by means of other producing methods. Further, besides the particles formed of Pt—Ru or Pt (Pt—Ru black or Pt black), any catalyst may be employed, so long as it has the catalytic function which facilitates the formation of H$^+$ from methanol or the formation of water from H$^+$ and oxygen. For example, catalyst-supporting carbon may be employed in which a catalyst is supported by carbon.

Air is supplied to the cathodes 1016 via cathode product discharge apertures 1028, and the reaction represented by equation (2) occurs. That is, the oxygen in the air reacts with the H$^+$ moved to the cathodes 1016 via the electrolyte membrane 1014 to thereby form product water.

$$3/2 * O_2 + 6H^+ + 6e^- \rightarrow 3H_2O \tag{2}$$

The cathode product discharge apertures 1028 supply air to the cathodes 1016 and discharge the product water from the cathodes 1016. These apertures 1028 are provided such that the total area thereof is the same as that of the anode product discharge apertures 1026. However, the cathode product discharge apertures 1028 include a larger number of smaller diameter apertures as compared to the anode product discharge apertures 1026. The inner wall of the cathode product discharge apertures 1028 is coated with a functional coating material containing a photocatalyst such as titanium oxide. Further, the surface of the portion of the cathode side case 1024*c* in which portion the apertures 1028 are provided is also coated with the functional coating material. By arranging a larger number of smaller apertures, the product water discharged from the cathodes 1016 is prevented from passing therethrough as a water droplet. Further, by coating the inner wall with the functional coating material, the product water is thinly spreads over the inner wall surface without clogging the apertures, thereby facilitating the evaporation of the product water. Thus, the breeding of microorganisms or the like can be prevented. Desirably, in this functional coating material, metals such as silver, copper, and zinc are contained so that the organic material decomposition function or the antimicrobial function works even when the fuel cell 1100 is not irradiated with the light, such as sunlight, containing a specific wavelength which activates the photocatalyst. Moreover, if a user of the fuel cell 1100 touches the fuel cell 1100, an organic material may adhere to the fuel cell 1100. If the entire surface of the case 1024 is coated with the functional coating material, the adhered organic material can be decomposed. In this manner, a soil resistance function or the antimicrobial function can be provided to the fuel cell 1100.

In order to prevent the methanol fuel from flowing from the anodes 1010 to the cathodes 1016, O-rings 1034 (an anode side O-ring 1034*a* and a cathode side O-ring 1034*c*) are placed so as to surround the MEA 1012. In this embodiment, the O-rings 1034 are pressed by the cathode side case 1024*c* and the supporting member 1032 to prevent the methanol fuel from flowing from the anodes 1010 to the cathodes 1016 and to prevent oxygen from flowing to the anodes 1010. Desirably, the O-rings 1034 are made of a material having flexibility and corrosion resistance. Examples of the suitable O-ring material include natural rubber, nitrile rubber, acrylic rubber, urethane rubber, silicon rubber, butadiene rubber, styrene rubber, butyl rubber, ethylene-propylene rubber, and fluororubber.

In addition to the above construction, another construction may be employed. For preventing a user from touching the cathodes 1016, it is desirable that a porous Teflon (registered trade mark) sheet (not shown) or the like allowing air and product water to ventilate be inserted between the cathodes 1016 and the cathode side case 1024*c*. Moreover, adjustment may be carried out between the diameter of the cathode product discharge apertures 1028 and the thickness of the portion of the case 1024 in which portion the cathode product discharge apertures 1028 are provided. That is, the thickness of the case 1024 is set larger than the diameter of the cathode product discharge apertures 1028. In this manner, the case can be designed such that, if a user touches the surface of the case 1024 of the fuel cell 1100, the user is prevented from touching the cathodes 1016. Moreover, a lid member may be provided for covering the portion in which the cathode product discharge apertures 1028 are provided. In this manner, the MEA 1012 (particularly, the electrolyte membrane 1014) can be prevented from drying while the fuel cell 1100 is stopped, and a region in the cathodes 1016 side is protected from the entry of organic materials such as dust, bacteria the lid member can be provided in a space-saving manner.

In this embodiment, the description has been made for the case where the fuel chamber 1022 is a space filled with the methanol fuel. However, a three-dimensional sponge-like porous member capable of absorbing the methanol fuel may be inserted into the fuel chamber 1022. Examples of such a fuel absorbing member include: woven fabrics formed of a fiber, non-woven fabrics and felt made of materials such as nylon, polyester, rayon, cotton, polyester/rayon, polyester/acrylic, or rayon/polychlarl. Further, in this embodiment, the description has been made for the exemplary case where the case 1024 is coated with a functional coating material containing a photocatalyst. However, at least the antimicrobial function can be ensured by coating the surface of the case 1024 with a metal such as silver, copper, or zinc or by mixing a metal such as silver, copper, or zinc into a material forming the case 1024.

The second embodiment is useable not only in the planar type DMFC but also in a fuel cell for a portable device. The fuel cell for a portable device is frequently touched by a hand of a user, and the second embodiment is particularly useable in ventilation apertures for product water and vapor.

What is claimed is:

1. A fuel cell power generation apparatus comprising:
a fuel cell which generates electricity from fuel and oxygen in air and which comprises an electrolyte membrane, an anode electrode and an anode current collector that are provided on one surface of the electrolyte membrane, and a cathode electrode and a cathode current collector that are provided on the other surface of the electrolyte membrane; and
a case which contains the fuel cell therein, the case having an air intake port which takes in air to be supplied to the fuel cell and an emitted material discharge port which discharges an emitted material emitted from the fuel cell, and wherein
the case comprises, a condensation means which condenses the emitted material emitted from the fuel cell,
the air intake port and the condensation means are integrally connected and provided on the same surface opposite to the cathode current collector, and
the emitted material discharge port is provided on a surface different from the surface on which the air intake port and the condensation means are provided.

2. The fuel cell power generation apparatus according to claim 1, comprising an air ventilation unit which ventilates air from the air intake port to the emitted material discharge port.

3. The fuel cell power generation apparatus according to claim 2, wherein the air ventilation unit is a fan.

4. The fuel cell power generation apparatus according to claim 1, comprising an emitted material discharge passage which connects the condensation unit to the emitted material discharge port to thereby allow the emitted material condensed by the condensation unit to flow to the emitted material discharge port.

* * * * *